(12) United States Patent
Novick (10) Patent No.: US 7,738,319 B2
(45) Date of Patent: Jun. 15, 2010

(54) DETERMINING ANGLES OF ARRIVAL USING MULTIPATHS

(75) Inventor: Arnold W. Novick, Providence, RI (US)

(73) Assignee: Raytheon Company, Waltham, MA (US)

(*) Notice: Subject to any disclaimer, the term of this patent is extended or adjusted under 35 U.S.C. 154(b) by 756 days.

(21) Appl. No.: 11/683,712

(22) Filed: Mar. 8, 2007

(65) Prior Publication Data

US 2008/0219099 A1 Sep. 11, 2008

(51) Int. Cl.
*G01S 3/80* (2006.01)
(52) U.S. Cl. ....................................... 367/125
(58) Field of Classification Search ........... 367/124, 367/118, 125

See application file for complete search history.

(56) References Cited

U.S. PATENT DOCUMENTS

| | | | |
|---|---|---|---|
| 4,312,053 A * | 1/1982 | Lipsky | 367/127 |
| 5,218,359 A | 6/1993 | Minamisono | |
| 5,420,827 A | 5/1995 | Feintuch | |
| 5,565,764 A * | 10/1996 | Priebe et al. | 708/5 |
| 6,160,758 A | 12/2000 | Spiesberger | |
| 7,266,042 B1 | 9/2007 | Gent et al. | |
| 7,315,488 B2 * | 1/2008 | Novick et al. | 367/125 |
| 2001/0019516 A1 | 9/2001 | Wake et al. | |
| 2003/0223311 A1 | 12/2003 | Breed et al. | |
| 2007/0280051 A1 | 12/2007 | Novick et al. | |
| 2008/0219099 A1 * | 9/2008 | Novick | 367/118 |
| 2009/0122649 A1 * | 5/2009 | Novick et al. | 367/119 |
| 2009/0257312 A1 * | 10/2009 | Novick et al. | 367/119 |

FOREIGN PATENT DOCUMENTS

| | | |
|---|---|---|
| EP | 1 271 175 A | 1/2003 |
| GB | 1 430 051 A | 3/1976 |
| WO | WO 2007/145761 | 12/2007 |

OTHER PUBLICATIONS

Notification of transmittal of the International Search Report dated Jun. 25, 2008, PCT/US2008/054076.
Notification of transmittal of the Written Opinion of the International Searching Authority, or the Declaration dated Jun. 25, 2008, PCT/US2008/054076.
Spiesberger John L: "Linking auto- and cross-correlation functions with correlation equations: Application to estimating the relative travel times and amplitudes of multipath" Journal of the Acoustical Society of America, AIP / Acoustical Society of America, Melville, NY, US, vol. 104, No. 1, Jul. 1, 1998. pp. 300-312, XP012000371 ISSN: 0001-4966 the whole document.

(Continued)

*Primary Examiner*—Dan Pihulic
(74) *Attorney, Agent, or Firm*—Daley, Crowley, Mofford & Durkee, LLP (57) ABSTRACT

In one aspect, a method to determine multipath angles of arrival includes performing an autocorrelation on a first signal received at a first received beam from a signal source, performing a cross-correlation between the first signal and a second signal received at a second receive beam from the signal source, and determining an angle of arrival for a first path from the signal source and an angle of arrival for a second path from the signal source based on the autocorrelation and the cross-correlation.

21 Claims, 6 Drawing Sheets

OTHER PUBLICATIONS

Spiesberger J L: "Identifying Cross-Correlation Peaks Due to Multipaths With Application to Optimal Passive Localization of Transient Signals and Tomographic Mapping of the Environment" Journal of the Acoustical Society of America, AIP / Acoustical Society of America, Melville, NY, US, vol. 100, No. 2, Part 01, Aug. 1, 1996, pp. 910-917, XP000625838 ISSN: 0001-4966 the whole document.

Spiesberger John L: Finding the right cross-correlation peak for locating sounds in multipath environments with a fourth-moment function: Journal of the Acoustical Society of America, AIP / Acoustical Society of America, Melville, NY, US, vol. 108, No. 3, Sep. 1, 2000, pp. 1349-1352, XP012001899 ISSN: 0001-4966 the whole document.

Notification Concerning Transmittal of International Preliminary Report on Patentability (Chapter 1 of the Patent Cooperation Treaty), PCT/US2008/054076 dated Sep. 17, 2009, 2 pages.

International Preliminary Report on Patentability, PCT/US2008/054076 dated Sep. 17, 2009, 1 page.

Written Opinion of the International Searching Authority, PCT/US2008/054076 dated Sep. 17, 2009, 12 pages.

* cited by examiner

DETERMINING ANGLES OF ARRIVAL USING MULTIPATHS

BACKGROUND

It is known that an underwater vessel (i.e., a submarine) generates sound, which is generally referred to as passive sound, as it travels through the water. The passive sound is generated by a variety of sources, including, but not limited to, sound generated by a submarine propulsion system, sound generated by a submarine propeller, and sound generated by a submarine electrical power generator. It is known that submarine designers attempt to reduce these and other passive sound sources in order to make a submarine difficult to detect by acoustic means, therefore remaining as covert as possible.

Some anti-submarine warfare (ASW) sonar systems attempt to detect the passive underwater sound generated by an enemy submarine. Some other ASW sonar systems attempt to both detect the passive sound and also to localize and/or track the enemy submarine. Localization is used to identify a position of the enemy submarine in azimuth, and/or in range, and/or in depth.

Passive ASW sonar systems attempt to detect, localize, and/or track the enemy submarine using the received passive sound only. The passive sonar system can remain covert and undetectable by the enemy submarine. Some known passive sonar systems use beam-forming techniques to generate receive beams. The receive beams can be steered azimuthally to detect, localize, and/or track the enemy submarine in azimuth. The receive beam can also be steered to vertical angles.

Even at relatively short ranges, localization in depth and range is not generally possible when receiving only passive sound and depending upon a pointing direction of receive beams (directed to a vertical beam steer angle). This is because for any receive beam and associated vertical beam that points toward an enemy submarine, the enemy submarine can be positioned at an essentially infinite number of depths and ranges along the vertical beam steer angle.

At longer ranges, localization of the enemy submarine in range and depth is made even more difficult by a variety of factors, including but not limited to, a tendency of the passive sound generated by the enemy submarine to bend (i.e. refract), primarily in a vertical direction, as the sound propagates through the water. Therefore, the vertical angle of arrival at which the greatest amount of sound arrives at the sonar system, which is related to a particular receive vertical beam angle, does not necessarily point in the direction of the enemy submarine.

However, it has been shown that vertical angles of arrival may be used to determine range and depth. Conventional techniques to determine vertical angles of arrival are generally applied to single path vertical angles of arrival at an array. With a single path, the vertical angle of arrival may be determined using a variety of techniques including monopulse or multibeam interpolation techniques.

SUMMARY

In one aspect, a method to determine multipath angles of arrival includes performing an autocorrelation on a first signal received at a first received beam from a signal source, performing a cross-correlation between the first signal and a second signal received at a second receive beam from the signal source, and determining an angle of arrival for a first path from the signal source and an angle of arrival for a second path from the signal source based on the autocorrelation and the cross-correlation.

In another aspect, an article includes a machine-readable medium that stores instructions to determine multipath angles of arrival. The instructions cause a machine to perform an autocorrelation on a first signal received at a first received beam from a signal source, perform a cross-correlation between the first signal and a second signal received at a second receive beam from the signal source; and determine an angle of arrival for a first path from the signal source and an angle of arrival for a second path from the signal source based on the autocorrelation and the cross-correlation.

In a further aspect, an apparatus to determine multipath angles of arrival, includes circuitry to perform an autocorrelation on a first signal received at a first received beam from a signal source, perform a cross-correlation between the first signal and a second signal received at a second receive beam from the signal source and determine an angle of arrival for a first path from the signal source and an angle of arrival for a second path from the signal source based on the autocorrelation and the cross-correlation.

In a still further aspect, an acoustic system includes an acoustic sensor configured to receive a first signal received at a first received beam from a signal source and a second signal received at a second receive beam from the signal source. The acoustic system also includes a processing system configured to determine angles of arrival and coupled to the acoustic sensor. The processing system includes an autocorrelation module configured to perform an autocorrelation on the first signal, a cross-correlation module configured to perform a cross-correlation between the first signal and a second signal received at a second receive beam from the signal source and an angle processing module configured to determine an angle of arrival for a first path from the signal source and an angle of arrival for a second path from the signal source based on the autocorrelation and the cross-correlation.

DETAILED DESCRIPTION

Angles of arrival and time delays may be used together to estimate range and depth of objects using acoustical methods as shown in U.S. patent application Ser. No. 11/422,435, filed on Jun. 6, 2006, titled "Methods and Systems for Passive Range and Depth Localization," which is incorporated herein in its entirety and has an obligation of assignment to the same entity as this patent application. Prior art techniques determine vertical angles by measuring single path arrival angles.

In contrast to prior art approaches, described herein is an approach to determining angles of arrival (e.g., vertical, horizontal and so forth) in acoustics that uses more than one receive beam for multipaths, e.g., using two receive beam patterns receiving two signal from two arrival paths. However, in using more than one receive beam to receive signals from the multipaths, received signals interact multiplicatively and therefore it is hard to mathematically separate the received signals.

While the techniques in the description herein focus on broadband and acoustic signals, the techniques may be applied to any broadband signal environment.

Figure 1:
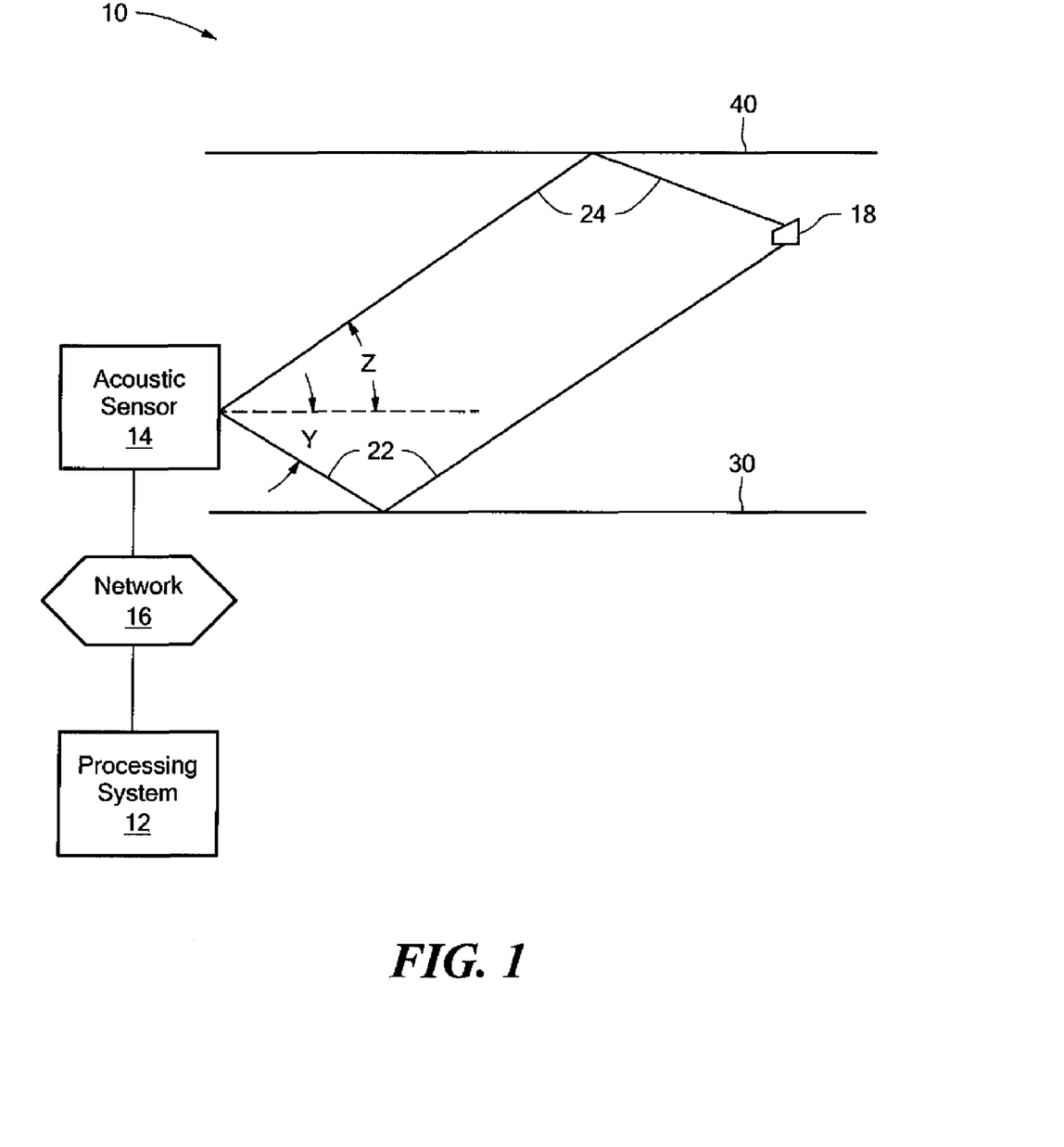
FIG. 1 is a diagram of an acoustic system.

Referring to FIG. 1, an acoustics system 10 includes a processing system 12 and an acoustic sensor system 14 connected to the processing system 12 by a network 16. The acoustic sensor system 14 receives acoustic signals from an object 18. For example, the received acoustic signals may be from active measures (e.g., a reflected signal resulting from a signal sent from the acoustic system 10) or from passive measures (e.g., receiving an acoustic signal resulting from movement of the object 18 or other acoustics emanating from the object 18). The received signals may take more than one path back to the acoustic sensor system 14. For example, one path is a first arrival path 22 is reflected off an ocean floor 30. Another path, a second arrival path 24, is reflected off a surface 40 of water. In other examples, either the first arrival path 22 or the second arrival path 24 may be a direct path to the acoustic sensor system 14. An angle, Y, represents the angle of arrival of the first arrival path 22. An angle, Z, represents the angle of arrival of the second arrival path 24. In this example, the angles of arrival, Y and Z, are vertical angles. In other examples, such as a ship receiving signals from under water, the angles of arrival may be horizontal angles.

In one example, the acoustic sensor system 14 may include one or more sonar sensors, such as sonobuoys. In another example, the acoustic sensor system 14 is a sonar sensor located aboard a submarine. In one example, the network 16 may be a wired or a wireless network.

The processing system 12 may be located on a ground-based platform (e.g., in a building, in a vehicle and so forth), a space-based platform (e.g., a satellite, a space-vehicle and so forth), a sea-based platform (e.g., a ship, a submarine, a buoy, an anchored sea structure, a torpedo, an undersea robotic vehicle and so forth) or on an air-based platform (e.g., an aircraft, a helicopter, a missile and so forth).

In one example, the processing system 12 may be co-located (i.e., on the same platform) with the acoustic sensor system 14. In other examples, the processing system 12 is not co-located with the acoustic sensor system 14.

As will be shown below, the approach described herein uses more than one arrival path to determine the angles of arrival. The following is an illustrative mathematical support to determine angles of arrival using two receive beams to receive two signals from two arrival paths.

For a first arrival path, a relative arrival time is $t_1$, a relative amplitude of a medium (e.g., an ocean) is $A_1$, a first beam pattern voltage amplitude is $v_{11}$ and a second beam pattern voltage amplitude is $v_{21}$; and for a second arrival path, a relative arrival time is $t_2$, a relative amplitude of the medium is $A_2$, a first beam pattern voltage amplitude is $v_{12}$ and a second beam pattern voltage amplitude is $v_{22}$, where $A_i$ is the complex medium transfer function of an i-th path, $v_{ij}$ is a j-th beam pattern response for the i-th path arrival angle and $t_i$ is the travel time associated with the i-th path. Voltage amplitude, $v_{ij}$, is assumed to be real to simplify the analysis since the extension for a complex beam pattern response is straightforward for one of ordinary skill in the art. It is assumed that $t_2$ is greater than $t_1$.

If s(t) represents a signal source, a received signal at the first receive beam from the signal source received from the first arrival path and the second arrival path is described as:

$$s_1(t) = v_{11} \cdot A_1 \cdot s(t-t_1) + v_{12} \cdot A_2 \cdot s(t-t_2).$$

A received signal at the second beam source from the signal source received from the first arrival and the second arrival path is described as:

$$s_2(9t) = v_{21} \cdot A_1 \cdot s(t-t_1) + v_{22} \cdot A_2 \cdot s(t-t_2).$$

The two signal components comprising $s_1(t)$ are separated by $\tau = t_2 - t_1$. The autocorrelation of $s_1$ results in a correlator output of exhibiting peaks at delays of $\tau = 0$, $\pm(t_2-t_1)$. The magnitude of the peak at $\tau = 0$ is given by $$[|v_{11} \cdot A_1| + |v_{12} \cdot A_2|^2] \cdot \langle s^2 \rangle,$$

where $\langle s^2 \rangle$ is the average energy of the source. The magnitude of the peak at $\tau=0$ provides the measure of the total signal energy, but is not useful for determining the angles of arrival because the signals from the two paths are combined.

Next consider the peak at $\tau = +(t_2-t_1) = \tau_{21}$, where the signal is being delayed. The magnitude of the peak is given by:

$$\rho_{11}(\tau_{21}) = v_{11} \cdot v_{12} \cdot A_1 \cdot A_2^* \langle s^2 \rangle.$$

Similarly, if the signal is advanced by $\tau = -(t_2-t_1)$, then $$\rho_{11}(\tau_{21}) = v_{11} \cdot v_{12} \cdot A_1 \cdot A_2^* \langle s^2 \rangle$$

$\rho_{11}(\tau_{21})$ and $\rho_{11}(-\tau_{21})$ are identical and contain the product of the beam pattern at the two different angles, $v_{11} \cdot v_{12}$, but it is not possible to uniquely solve for an angle pair from this product.

Next consider the cross correlation of signals received at receive beams 1 and 2, which will produce peaks at the same delays as the above autocorrelation because the receive beams are collocated. At $\tau = +\tau_{21}$, where the copy of beam 2 signal is being delayed, the magnitude of the peak is given by $$\rho_{12}(\tau_{21}) = v_{12} \cdot v_{21} \cdot A_1 \cdot A_2^* \langle s^2 \rangle.$$

Similarly if beam 2 is advanced by $\tau = -(t_2-t_1)$, the magnitude of the peak is given by:

$$\rho_{12}(-\tau_{21}) = v_{22} v_{11} \cdot A_1 \cdot A_2^* \langle s^2 \rangle.$$

Once again, these terms contain the product of two unknown beam pattern values and it is not possible to uniquely determine the angles of arrival.

However, using the auto correlation and cross correlation together, one may solve for the angles of arrival. For example, let the ratio of the cross correlation peak amplitude to the corresponding autocorrelation peak be denoted by $X(\tau)$, then $$X(\tau_{21}) = (\rho_{12}(\tau_{21}))/(\rho_{11}(\tau_{21}))$$

$$X(\tau_{21}) = (v_{11} \cdot v_{22} \cdot A_1 \cdot A_2^* \langle s^2 \rangle)/(v_{11} \cdot v_{12} \cdot A_1 \cdot A_2^* \langle s^2 \rangle)$$

$$X(\tau_{21}) = v_{22}/v_{12}.$$

Since the ratio of the beam pattern main lobes is a monotonic function (i.e., a unique relationship between the beam pattern main lobe ratios and the angle of arrival over the interval of interest is guaranteed), the ratio will enable one to determine the second path arrival angle by inverting or interpolating the beam pattern ratio function using the measured value of $X(\tau)$.

Similarly, the ratio of the correlation peaks for $\tau = -\tau_{21}$ produces the ratio for the first path angle of arrival, that is $$X(-\tau_{21}) = v_{21}/v_{11}.$$

Figure 2:
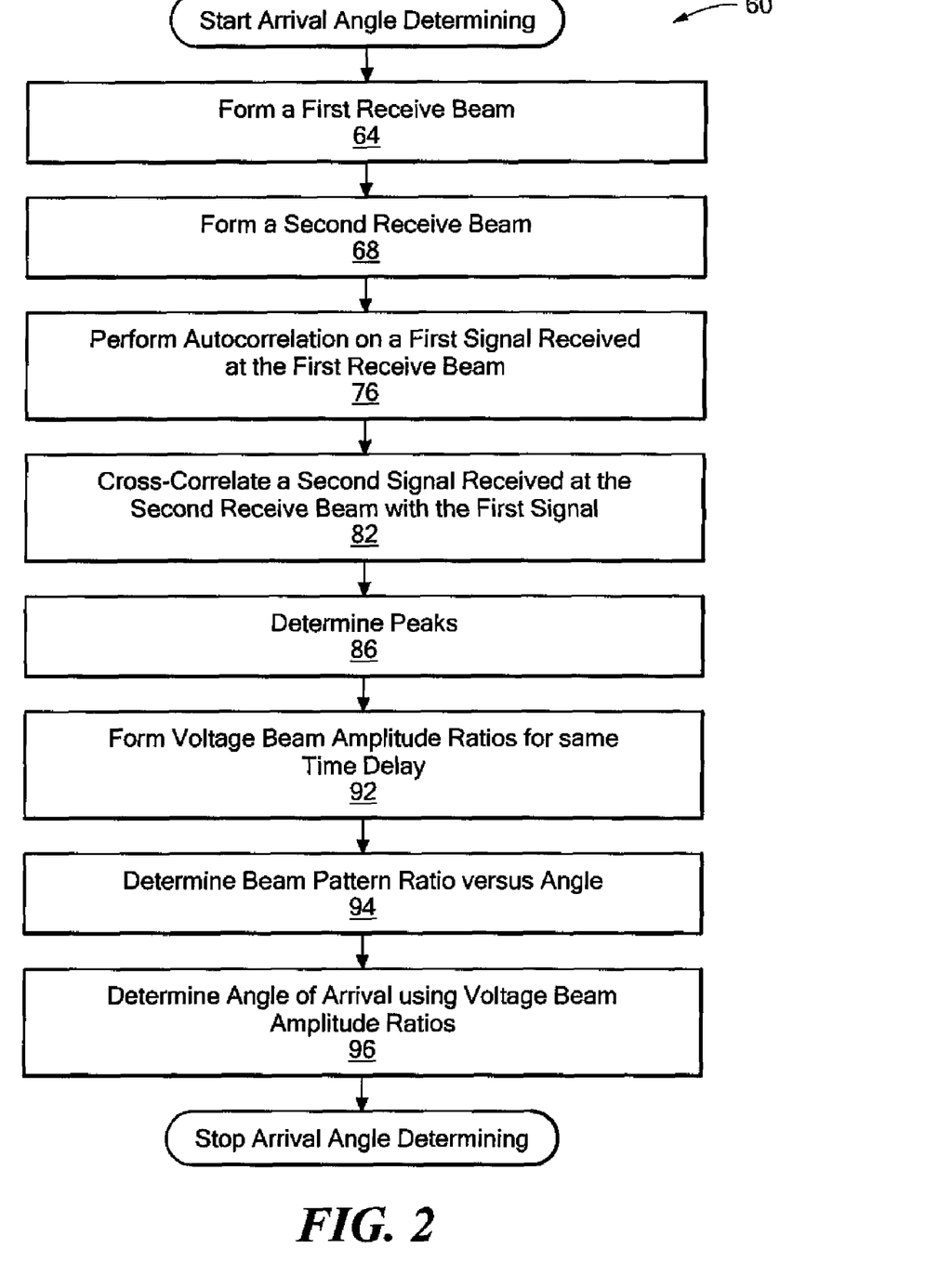
FIG. 2 is a flowchart of a process to determine angles of arrival.
Figure 3:
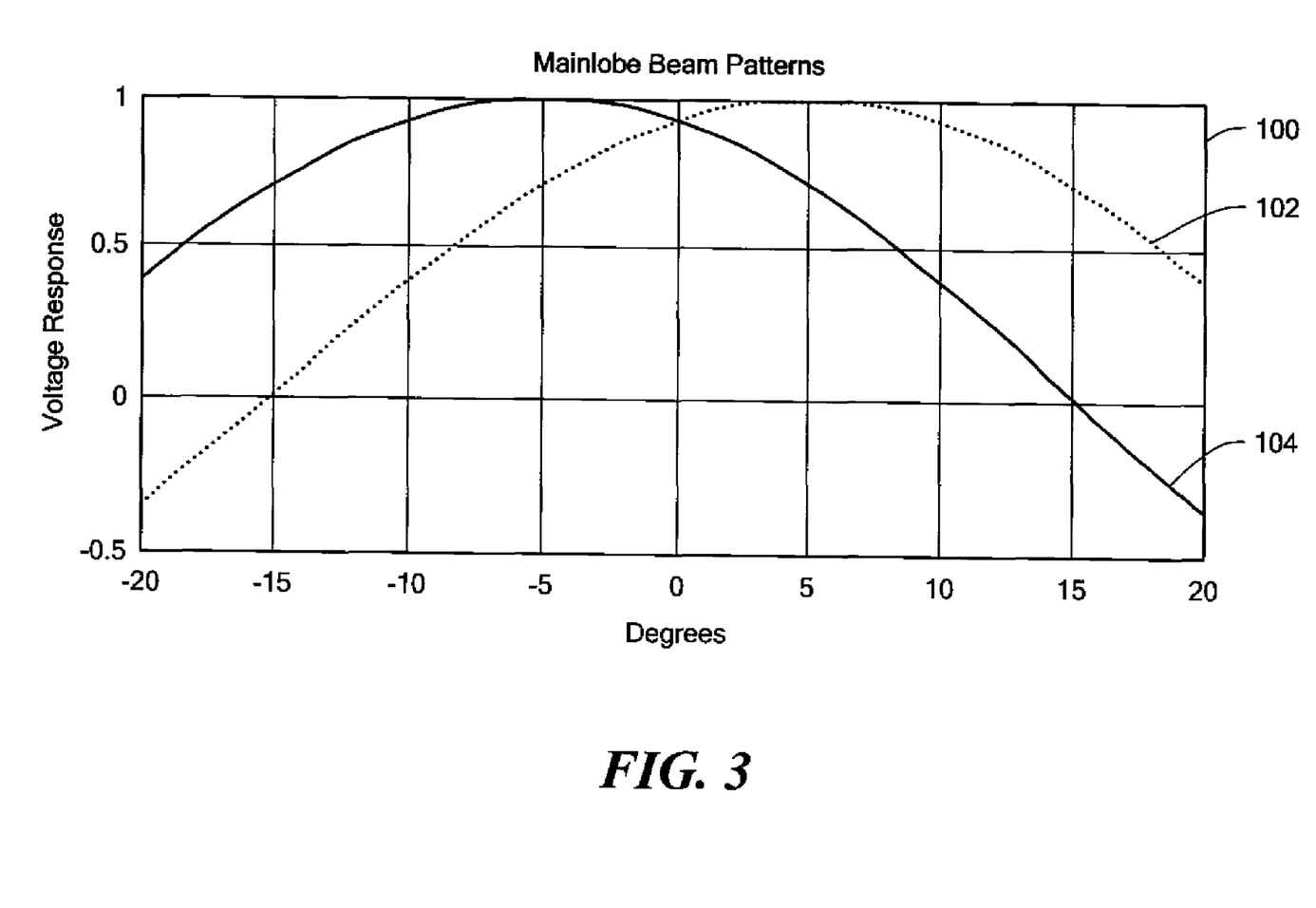
FIG. 3 is a graph of an example of a first receive beam and a second receive beam.

Referring to FIG. 2, a process 60 is one example to determine angles of arrival. Process 60 forms a first receive beam (64). For example, the first receive beam is formed as a detection beam. In one example, the first receive beam 102 has a main lobe centered at −5 degrees in a graph 100 (See FIG. 3). Process 60 forms a second receive beam (68). For example, the second receive beam is formed as a detection beam that overlaps the first receive beam. In one example, the second receive beam has a main lobe centered at +5 degrees in the graph 100 (See FIG. 3)

For convenience, the present example considers the case of collocated beams. The technique will operate with separate arrays provided that the channel amplitude functions are comparable or can be estimated, and that the corresponding multipath pair delays can be matched.

When more than two paths and/or two beams are available, the present technique can be applied to each of the path-pair and/or beam combination. This process may generate multiple estimates of the same arrival path; in this case, the estimates can be weighted and averaged to obtain a better estimate than that achieved using a single path.

Figure 4:
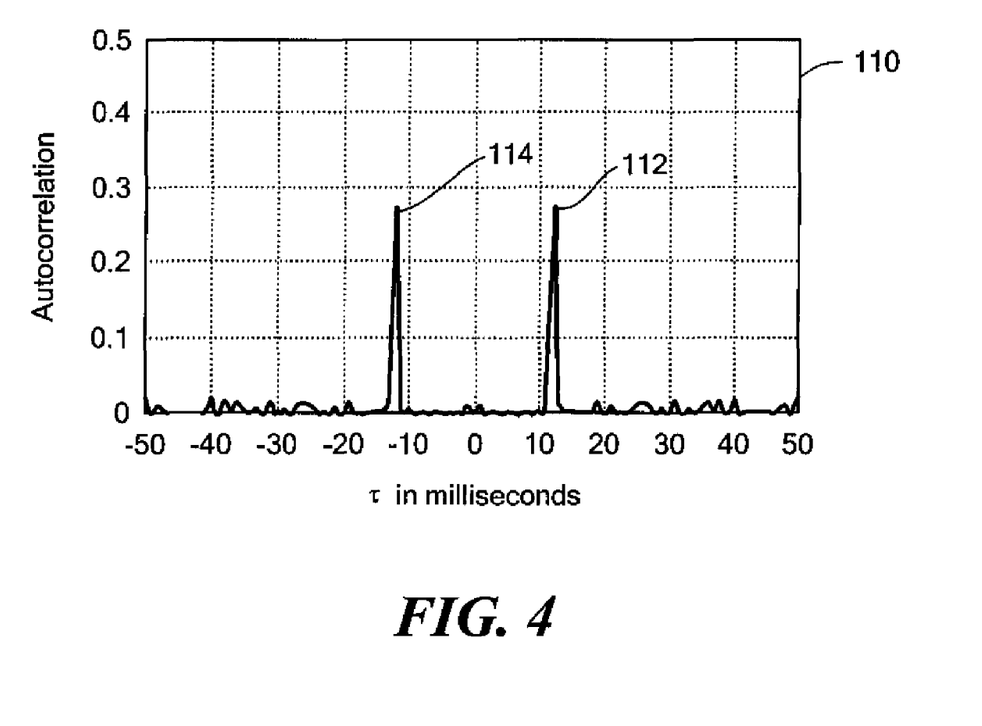
FIG. 4 is a graph of an autocorrelation of a first signal received by the first receive beam in FIG. 3.

Process 60 performs an autocorrelation of a first signal received at the first receive beam (76). In one example, the first arrival path 22 has relative travel time, $t_1$, of 17 ms with a relative amplitude, $A_1$, of zero dB. The second arrival path 24 has a relative travel time, $t_2$, of 29 ms and a relative amplitude, $A_2$, of −2 dB. The $\tau$ is $t_2-t_1$ or 12 ms. The unknown angles to solve are Y and Z. The auto correlation of the first signal received at the first receive beam 102 (FIG. 3) is shown in a graph 110 depicted FIG. 4.

Figure 5:
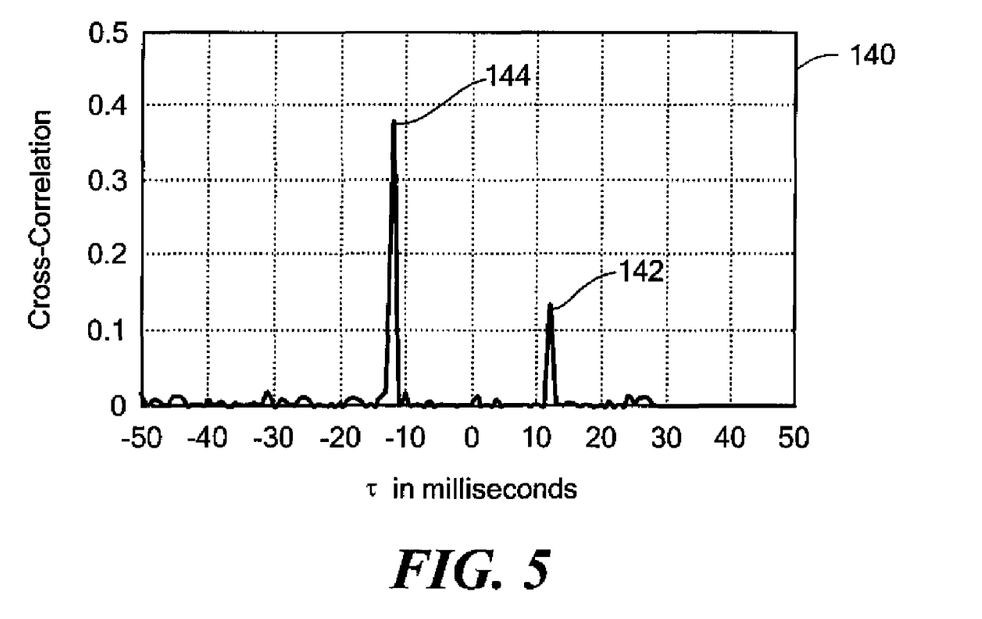
FIG. 5 is a graph of a cross correlation of the first signal received by the first beam and a second signal received by the second receive beam in FIG. 3.

Process 60 cross-correlates a second signal received at the second receive beam with the first signal (82). In one example, the cross correlation of the first signal and the second signal is shown in FIG. 5.

Process 60 determines peaks (86). For example the autocorrelation peaks and the cross correlation peaks are determined. In one example of the auto correlation, one peak 112 is at 12 ms corresponding to an autocorrelation amplitude of 0.28 and the other peak 114 is at −12 ms corresponding to an autocorrelation amplitude of 0.28 (see FIG. 4). The correlation peak at time equal zero has been omitted for scaling purposes. In one example of the cross correlation, one peak 142 is at 12 ms corresponding to a cross correlation amplitude of 0.125 and the other peak 144 is at −12 ms corresponding to a cross correlation amplitude of 0.38 (See FIG. 5). The correlation peak at time equal zero has been omitted for scaling purposes.

Process 60 forms voltage beam amplitude ratios for the same time delay (92). For example, the voltage beam amplitude ratio of the second path is given by:

$$v_{22}/v_{12}=(\rho_{12}(+\tau_{21}))/(\rho_{11}(+\tau_{21})),$$

and the voltage beam amplitude ratio of the first path is given by:

$$v_{21}/v_{11}=(\rho_{12}(-\tau_{21}))/(\rho_{11}(-\tau_{21}))$$

Using the autocorrelation and cross correlation peaks in the example for processing block 86:

$$v_{21}/v_{11}=0.38/0.28=1.35$$

and $$v_{22}/v_{12}=0.125/0.28=0.45$$

Process 60 determines beam pattern voltage ratio versus angle (94). For example in FIG. 6, a graph 160 has a curve 162 of the voltage ratios of the first receive beam divided by the second receive beam (from FIG. 3) versus angles.

Figure 6:
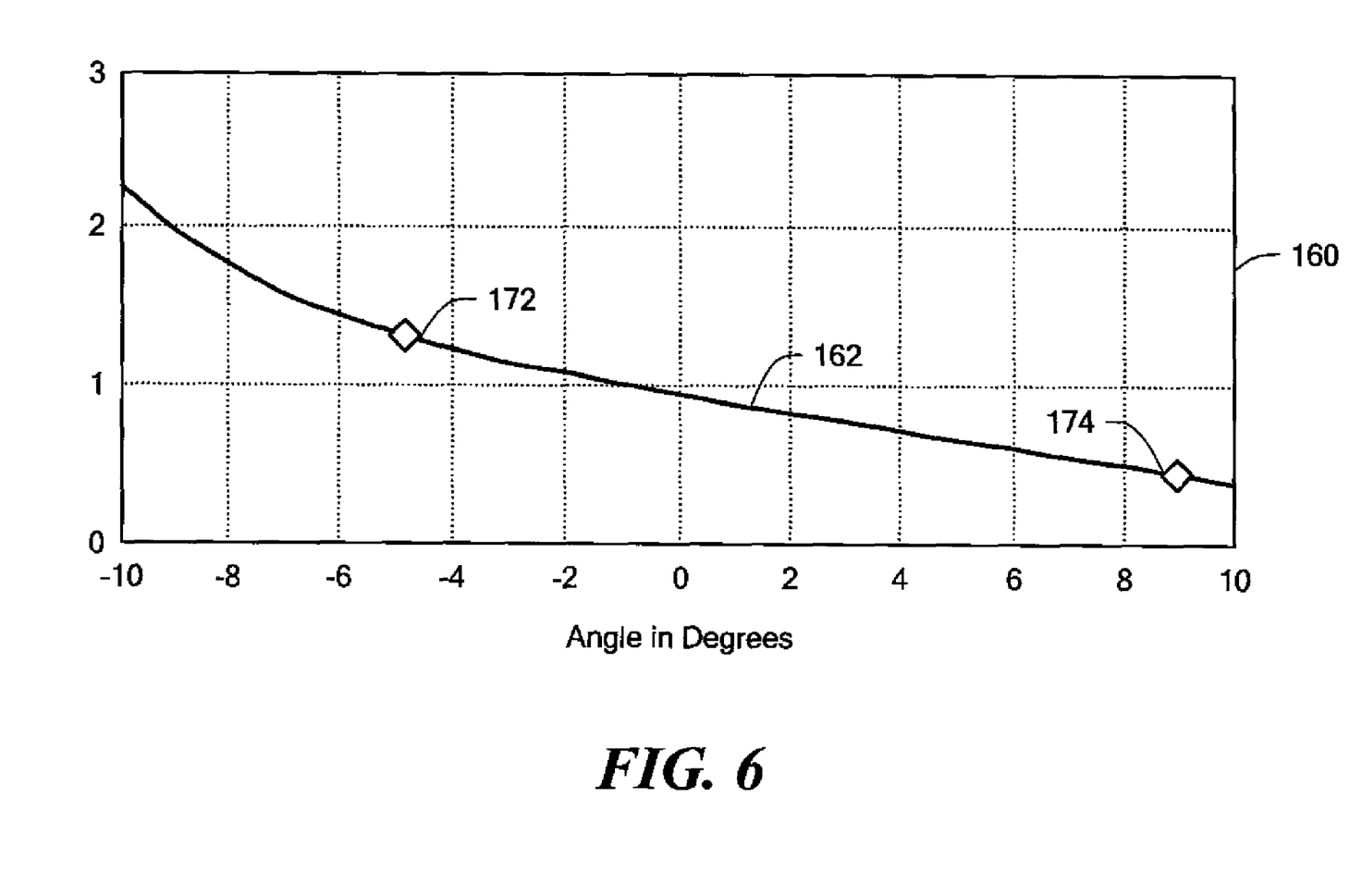
FIG. 6 is a graph of voltage ratios of the first receive beam and the second receive beam versus angle.

Process 60 solves for angles of arrival using the voltage beam amplitude ratios (96). In the preceding examples for processing block, $v_{22}/v_{12}=0.125/0.28=0.45$ at a point 172 corresponds to a first path arrival angle (Angle Y) of −5 degrees and $v_{21}/v_{11}=0.38/0.28=1.35$ at a point 174 corresponds to a second path arrival angle (Angle Z) of +9 degrees.

Figure 7:
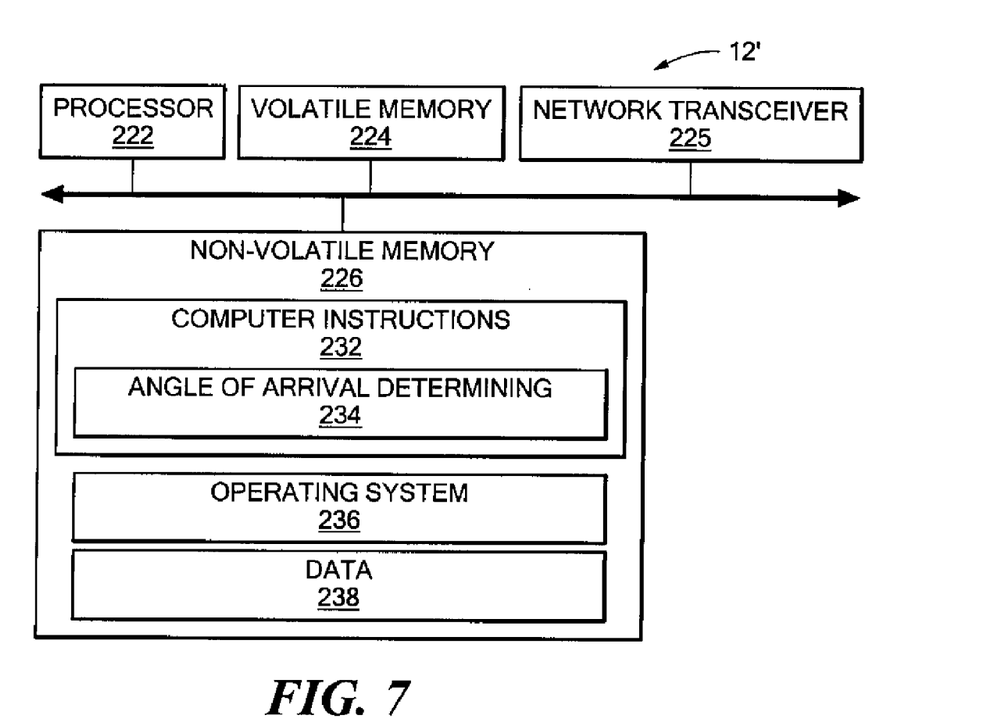
FIG. 7 is a block diagram of an example of a processing system on which the process of FIG. 2 may be implemented.
Figure 8:
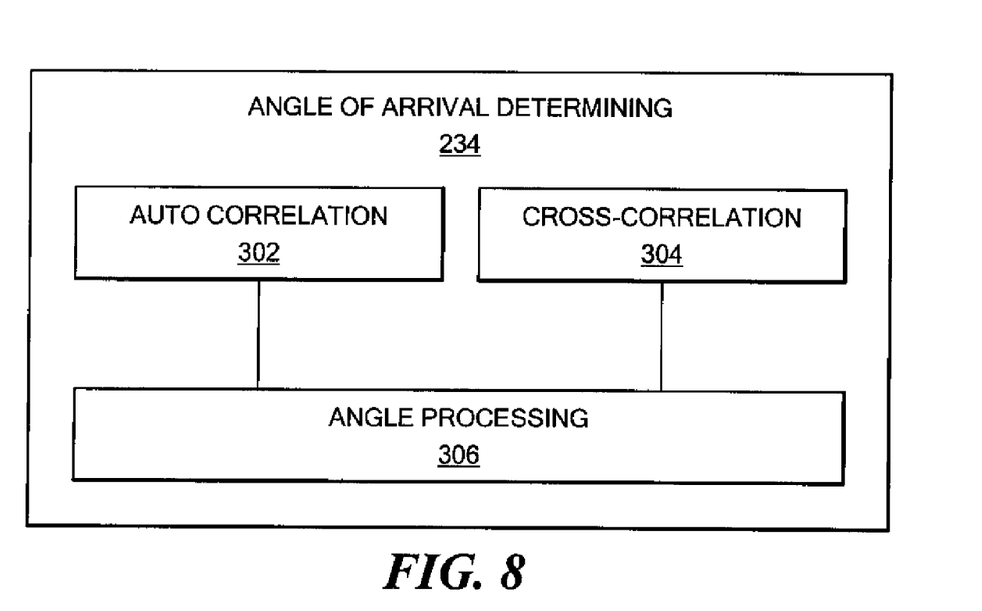
FIG. 8 is a block diagram of an example of instructions for angle of arrival determining.

Referring to FIG. 7, in one example, the processing system 12 may be a processing system 12'. The processing system 12' includes a processor 222, a volatile memory 224, a non-volatile memory 226 (e.g., hard disk) and a network transceiver 225. The non-volatile memory 226 stores computer instructions 232, an operating system 236 and data 238. The computer instructions 232 include instructions to determine an angle of arrival 234. In one example depicted in FIG. 8, the instructions to determine an angle of arrival 234 include auto correlation instructions 302 (e.g., instructions to perform processing block 76 of FIG. 2), cross-correlation instructions 304 (e.g., instructions to perform processing block 82 of FIG. 2) and angle processing instructions 306 (e.g., instructions to perform processing blocks 86, 92, 94 and 96 of FIG. 2). The transceiver 225 is used to communicate with the acoustic sensor system 14. In one example, the computer instructions 232 are executed by the processor 222 out of volatile memory 224 to perform process 60.

Process 60 is not limited to use with the hardware and software of FIG. 7; it may find applicability in any computing or processing environment and with any type of machine or set of machines that is capable of running a computer program. Process 60 may be implemented in hardware, software, or a combination of the two. Process 60 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 60 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 60. Process 60 may also be implemented as a machine-readable storage medium, configured with a computer program, where upon execution, instructions in the computer program cause the computer to operate in accordance with process 60.

The processes described herein are not limited to the specific embodiments described herein. For example, the process 60 is not limited to the specific processing order of FIG. 2. Rather, any of the processing blocks of FIG. 2 may be reordered, combined or removed, performed in parallel or in serial, as necessary, to achieve the results set forth above.

The processing blocks in FIG. 2 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method comprising:
   using a hardware apparatus to determine multipath angles of arrival by:
   performing an autocorrelation on a first signal received at a first received beam from a signal source;
   performing a cross-correlation between the first signal and a second signal received at a second receive beam from the signal source; and
   determining autocorrelation peaks from the autocorrelation;
   determining cross-correlation peaks from the cross-correlation;
   determining voltage beam amplitude ratios using the autocorrelation peaks and the cross-correlation peaks; and
   determining an angle of arrival for a first path from the signal source and an angle of arrival for a second path from the signal source using the voltage beam amplitude ratios.

2. The method of claim 1 wherein performing an autocorrelation on a first signal received at a first received beam comprises performing an autocorrelation on a first signal comprising a first signal component from the first path and a second signal component from the second path, the first signal component and the second signal component are separated in time.

3. The method of claim 1, further comprising determining a beam pattern ratio of the first beam and the second beam versus angle to form a curve,
   wherein using the voltage beam amplitude ratios comprises using the voltage beam amplitude ratios to locate the angle of arrival for the first path and the angle of arrival for the second path on the curve.

4. The method of claim 1 wherein determining an angle of arrival for a first path and an angle of arrival for a second path comprises determining vertical angles of arrival.

5. The method of claim 1 wherein determining an angle of arrival for a first path and an angle of arrival for a second path comprises determining horizontal angles of arrival.

6. The method of claim 1 wherein determining an angle of arrival for a first path and an angle of arrival for a second path comprises determining angles of arrival for received acoustic signals.

7. An article comprising a machine-readable medium that stores instructions to determine multipath angles of arrival, the instructions causing a machine to:
   perform an autocorrelation on a first signal received at a first received beam from a signal source;
   perform a cross-correlation between the first signal and a second signal received at a second receive beam from the signal source;
   determine autocorrelation peaks from the autocorrelation;
   determine cross-correlation peaks from the cross-correlation;
   determine voltage beam amplitude ratios for an equivalent time delay using the autocorrelation peaks and the cross-correlation peaks; and
   determine an angle of arrival for a first path from the signal source and an angle of arrival for a second path from the signal source using the voltage beam amplitude ratios.

8. The article of claim 7 wherein the instructions causing the machine to perform an autocorrelation on a first signal received at a first received beam comprises instructions causing the machine to perform an autocorrelation on a first signal comprising a first signal component from the first path and a second signal component from the second path, the first signal component and the second signal component are separated in time.

9. The article of claim 7, further comprising instructions causing the machine to determine a beam pattern ratio of the first beam and the second beam versus angle to form a curve,
   wherein the instructions causing the machine to use the voltage beam amplitude ratios comprises instructions causing the machine to use the voltage beam amplitude ratios to locate the angle of arrival for the first path and the angle of arrival for the second path on the curve.

10. The article of claim 7 wherein the instructions causing the machine to determine an angle of arrival for a first path and an angle of arrival for a second path comprises instructions causing the machine to determine one of vertical angles of arrival and horizontal angles of arrival.

11. The article of claim 7 wherein the instructions causing the machine to determine an angle of arrival for a first path and an angle of arrival for a second path comprises instructions causing the machine to determine angles of arrival for received acoustic signals.

12. An apparatus to determine multipath angles of arrival, comprising:
    circuitry to:
    perform an autocorrelation on a first signal received at a first received beam from a signal source;
    perform a cross-correlation between the first signal and a second signal received at a second receive beam from the signal source;
    determine autocorrelation peaks from the autocorrelation;
    determine cross-correlation peaks from the cross-correlation;
    determine voltage beam amplitude ratios for an equivalent time delay using the autocorrelation peaks and the cross-correlation peaks; and
    determine an angle of arrival for a first path from the signal source and an angle of arrival for a second path from the signal source using the voltage beam amplitude ratios.

13. The apparatus of claim 12 wherein the circuitry comprises at least one of a processor, a memory, programmable logic and logic gates.

14. The apparatus of claim 12 wherein the circuitry to perform an autocorrelation on a first signal received at a first received beam comprises circuitry to perform an autocorrelation on a first signal comprising a first signal component from the first path and a second signal component from the second path, the first signal component and the second signal component are separated in time.

15. The apparatus of claim 12, further comprising circuitry to determine a beam pattern ratio of the first beam and the second beam versus angle to form a curve,
wherein the circuitry to use the voltage beam amplitude ratios comprises circuitry to use the voltage beam amplitude ratios to locate the angle of arrival for the first path and the angle of arrival for the second path on the curve.

16. The apparatus of claim 12 wherein the circuitry to determine an angle of arrival for a first path and an angle of arrival for a second path comprises circuitry to determine one of vertical angles of arrival and horizontal angles of arrival.

17. The apparatus of claim 12 wherein the circuitry to determine an angle of arrival for a first path and an angle of arrival for a second path comprises circuitry to determine angles of arrival for received acoustic signals.

18. An acoustic system, comprising:
an acoustic sensor configured to receive a first signal received at a first received beam from a signal source and a second signal received at a second receive beam from the signal source; and
a processing system configured to determine angles of arrival and coupled to the acoustic sensor, the processing system comprising:
an autocorrelation module configured to perform an autocorrelation on the first signal;
a cross-correlation module configured to perform a cross-correlation between the first signal and a second signal received at a second receive beam from the signal source; and
an angle processing module configured to determine an angle of arrival for a first path from the signal source and an angle of arrival for a second path from the signal source using voltage beam amplitude ratios determined using the autocorrelation peaks and the cross-correlation peaks.

19. The acoustic system of claim 18 wherein the acoustic sensor comprises a sonar sensor.

20. The acoustic system of claim 19 wherein the first path and the second path include a water medium.

21. The acoustic system of claim 19 wherein the signal source is associated with passive sonar measures.

* * * * *

UNITED STATES PATENT AND TRADEMARK OFFICE
CERTIFICATE OF CORRECTION

PATENT NO. : 7,738,319 B2  Page 1 of 1
APPLICATION NO. : 11/683712
DATED : June 15, 2010
INVENTOR(S) : Novick It is certified that error appears in the above-identified patent and that said Letters Patent is hereby corrected as shown below:

Column 3, line 2, delete "signal" and replace with -- signals --.

Column 3, line 21, delete "is" and replace with -- and is --.

Column 4, line 5, delete "$v_1$" and replace with -- $v_{11}$ --.

Column 4, line 9, delete "$s_2(^{9t})$" and replace with -- $s_2(t)$ --.

Column 4, line 14, delete "by" and replace with -- by: --.

Column 4, line 15, delete "]" and replace with -- ] --.

Column 4, line 35, delete "by" and replace with -- by: --.

Column 4, line 42, delete "$v_{22}v_{11}$" and replace with -- $v_{22} \cdot v_{11}$ --.

Column 4, line 45, delete "auto correlation" and replace with -- autocorrelation --.

Column 5, line 8, delete "(See FIG. 3)" and replace with -- (See FIG. 3). --.

Column 5, line 26, delete "auto correlation" and replace with -- autocorrelation --.

Column 5, line 28, delete "depicted" and replace with -- depicted in --.

Column 5, line 35, delete "auto correlation," and replace with -- autocorrelation, --.

Column 6, line 3, delete "processing block," and replace with
-- the processing blocks, --.

Signed and Sealed this

Twenty-eighth Day of September, 2010

David J. Kappos
*Director of the United States Patent and Trademark Office*